United States Patent
Warden et al.

(10) Patent No.: US 9,675,915 B1
(45) Date of Patent: Jun. 13, 2017

(54) SEPARATOR FOR DEWATERING PARTICULATE MATTER SUSPENDED IN WATER

(71) Applicant: Englo, Inc., Beckley, WV (US)

(72) Inventors: Timothy Wayne Warden, Beckley, WV (US); Sita Miller, Lexington Park, MD (US); Rubin Shmulsky, Starkville, MS (US); Joseph C Finn, Travelers Rest, SC (US); Ronald C Lane, Pisgah Forest, NC (US)

(73) Assignee: Englo, Inc., Beckley, VA (US)

( * ) Notice: Subject to any disclaimer, the term of this patent is extended or adjusted under 35 U.S.C. 154(b) by 0 days.

(21) Appl. No.: 15/095,265

(22) Filed: Apr. 11, 2016

Related U.S. Application Data

(60) Provisional application No. 62/145,777, filed on Apr. 10, 2015.

(51) Int. Cl.
*B01D 33/64* (2006.01)
*B01D 33/68* (2006.01)
(Continued)

(52) U.S. Cl.
CPC ......... *B01D 33/646* (2013.01); *B01D 33/048* (2013.01); *B01D 33/68* (2013.01);
(Continued)

(58) Field of Classification Search
None
See application file for complete search history.

(56) References Cited

U.S. PATENT DOCUMENTS

| | | | | |
|---|---|---|---|---|
| 2,111,720 A | * | 3/1938 | Padgett | B01D 33/04 100/112 |
| 2,356,285 A | * | 8/1944 | Street | D21C 9/06 15/DIG. 7 |

(Continued)

*Primary Examiner* — Robert James Popovics
(74) *Attorney, Agent, or Firm* — Dinsmore & Shohl LLP; Monika L'Orsa Jaensson, Esq.

(57) ABSTRACT

The disclosed technology regards a water/solids separator for filtering slurry into residue cakes and filtrate water. The separator includes a frame supporting a plurality of rollers supporting a filter media belt, a plurality of blades and wipers for cleaning the rollers and removing excess filtrate water and cake material, and an inlet water manifold to distribute slurry water uniformly on the filter media belt. The frame supports a filter bed, with a slurry receiving area having a perforated panel at its base, for receiving, pre-filtering and moving the slurry through the separator, and a filter bed collection tub with an exit aperture for collecting and delivering filtrate to a water holding tank. The filter media belt traverses the plurality of rollers, through and about the filter bed, supported along a portion of its path by the perforated panel. Both a residue cake bin and a clean water holding tank may be provided with the system to collect residue and filtrate water, respectively, for re-use or disposal. The present invention also regards a method for separating filtrate water and cake residue from slurry, using the water/solids separator herein described, by continuously providing slurry through the inlet water manifold, while powering the gear motor to cause rotation of the drive roll, resulting in rotation of the filter media about the plurality of rollers. By this method and the disclosed technology, a portion of the water from the slurry is removed, through the filter media belt and the perforated panel.

16 Claims, 7 Drawing Sheets

(51) Int. Cl.
*B01D 33/048* (2006.01)
*B01D 33/052* (2006.01)
*C02F 1/00* (2006.01)

(52) U.S. Cl.
CPC ........ *C02F 1/001* (2013.01); *B01D 2033/052* (2013.01); *C02F 2201/002* (2013.01)

(56) References Cited

U.S. PATENT DOCUMENTS

| | | | | |
|---|---|---|---|---|
| 3,347,378 A * | 10/1967 | Arnold | ................ | B01D 29/096 |
| | | | | 210/106 |
| 3,938,206 A * | 2/1976 | Stranger-Johannessen | | D21C 9/06 |
| | | | | 162/60 |
| 4,481,118 A * | 11/1984 | Heissenberger | ..... | B01D 11/023 |
| | | | | 210/400 |
| 4,874,468 A * | 10/1989 | Sbaschnigg | .......... | B01D 33/042 |
| | | | | 162/300 |
| 6,846,421 B2 * | 1/2005 | Bratten | ................ | B01D 29/096 |
| | | | | 210/387 |
| 7,913,854 B2 * | 3/2011 | Bratten | ................. | B01D 33/04 |
| | | | | 210/400 |
| 8,147,689 B1 * | 4/2012 | Cogar | ................ | B01D 33/327 |
| | | | | 209/273 |
| 2003/0121843 A1 * | 7/2003 | Bratten | ................ | B01D 29/096 |
| | | | | 210/398 |
| 2007/0210013 A1 * | 9/2007 | Bratten | ................. | B01D 33/04 |
| | | | | 210/783 |

* cited by examiner

SEPARATOR FOR DEWATERING PARTICULATE MATTER SUSPENDED IN WATER

BACKGROUND OF THE TECHNOLOGY

The disclosed technology regards a system for separating particulate matter suspended in water into filtrate water and residue cake, useful in industrial operations with significant slurry waste. The disclosed technology further regards a method for dewatering waste slurry into filtrate water and residue cake for re-use or disposal.

Presently slurry waste produced in industrial applications dewatered by means of a filter bed, removing water from the slurry using gravity. This process takes a significant amount of space and time, and does not effectively dewater the slurry or produce a clean water stream for reuse in the industrial application. Therefore, there is a need to effectively and efficiently dewater the slurry, using an efficient and space-saving system, to quickly produce clean water that can be reused in the industrial application, and dewatered slurry that can be reused, treated or effectively disposed of.

GENERAL DESCRIPTION OF THE TECHNOLOGY

The disclosed technology regards a water/solids separator for filtering slurry into residue cakes and filtrate water. The separator includes a frame supporting a plurality of rollers, including four or more filter media idler rolls to support a filter media belt, a drive roll, wherein the rotation of the drive roll is powered by a gear motor, a filtrate press roll positioned above, and in near vertical alignment with, the drive roller, and a NIP roll positioned below and in near vertical alignment with the drive roll. The separator also includes an inlet water manifold having a plurality of pipes and pipe fittings to distribute slurry water uniformly on the filter media belt.

The frame supports a filter vessel, with a slurry receiving area having a perforated panel at its base, for receiving, pre-filtering and moving the slurry through the separator, and a filter vessel collection tub with an exit aperture for collecting and delivering filtrate to a clean water holding tank. The filter media belt traverses the plurality of rollers, through and about the filter vessel, supported along a portion of its path by the perforated panel of the filter vessel. Both a residue cake bin and a clean water holding tank may be provided with the system to collect residue and filtrate water, respectively, for re-use or disposal.

The technology further includes a plurality of blades and wipers for removing filtrate water and dewatered residue from the filter media belt and the rollers. One of these blades is coupled with the filtrate press roll to remove remaining residue on this roller.

The present invention also regards a method for separating filtrate water and cake residue from slurry, using the water/solids separator herein described. This method includes continuously providing slurry through the inlet water manifold, while powering the gear motor to cause rotation of the drive roll, resulting in rotation of the filter media about the plurality of rollers. By this method and the disclosed technology, a portion of the water from the slurry is removed, through the filter media belt and the perforated panel. The slurry is then pressed or dewatered between the drive roll and the press roll to dewater the slurry. Water from the press is directed back into the filter vessel collection tub, while residue cake from the press is directed into the residue cake bin. The rolls are scraped or wiped throughout the process to remove any excess water in the media, or cake residue remaining on the rolls, with the excess being directed to the filter vessel collection tub or residue cake bin, respectively.

DESCRIPTION OF THE FIGURES

The present technology may be understood by reference to the accompanying drawings, wherein.

DETAILED DESCRIPTION OF THE TECHNOLOGY

Figure 1:
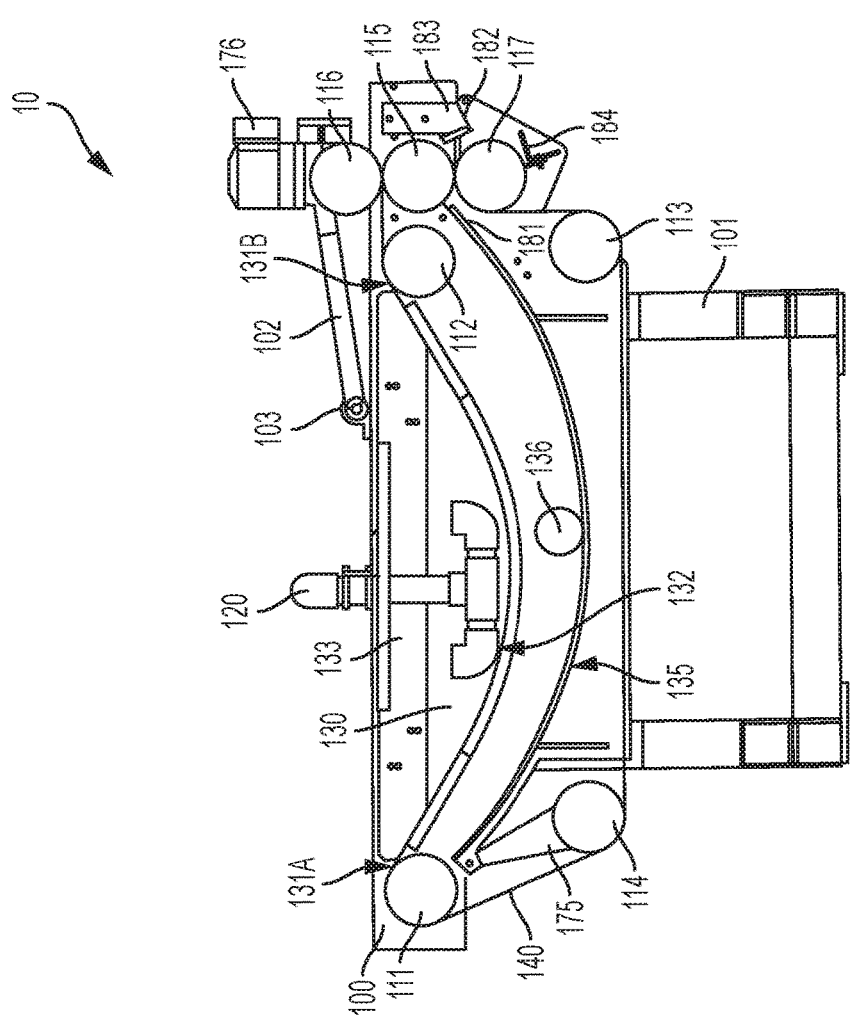
FIG. 1 is a side view of the internal components of an embodiment of the separator of the present technology.

As shown in the figures, the present technology regards a water/solids separator 10 for filtering slurry into residue cakes and filtrate water, the separator having a frame 100 supporting a plurality of rollers, an inlet water manifold 120, and a filter vessel 130. A filter media belt 140 traverses the plurality of rollers, in a closed loop, through and about the filter vessel. Also provided in the system of the present technology are a residue cake bin 150 for collecting residue cake dewatered by the system of the present technology, and a clean water holding tank 160 for collecting filtrate resulting from the dewatering process. Further, embodiments of the technology include blades and wipers for removing dewatered filtrate and residue from the rollers and the filter media belt as it traverses the rollers.

Figure 3:
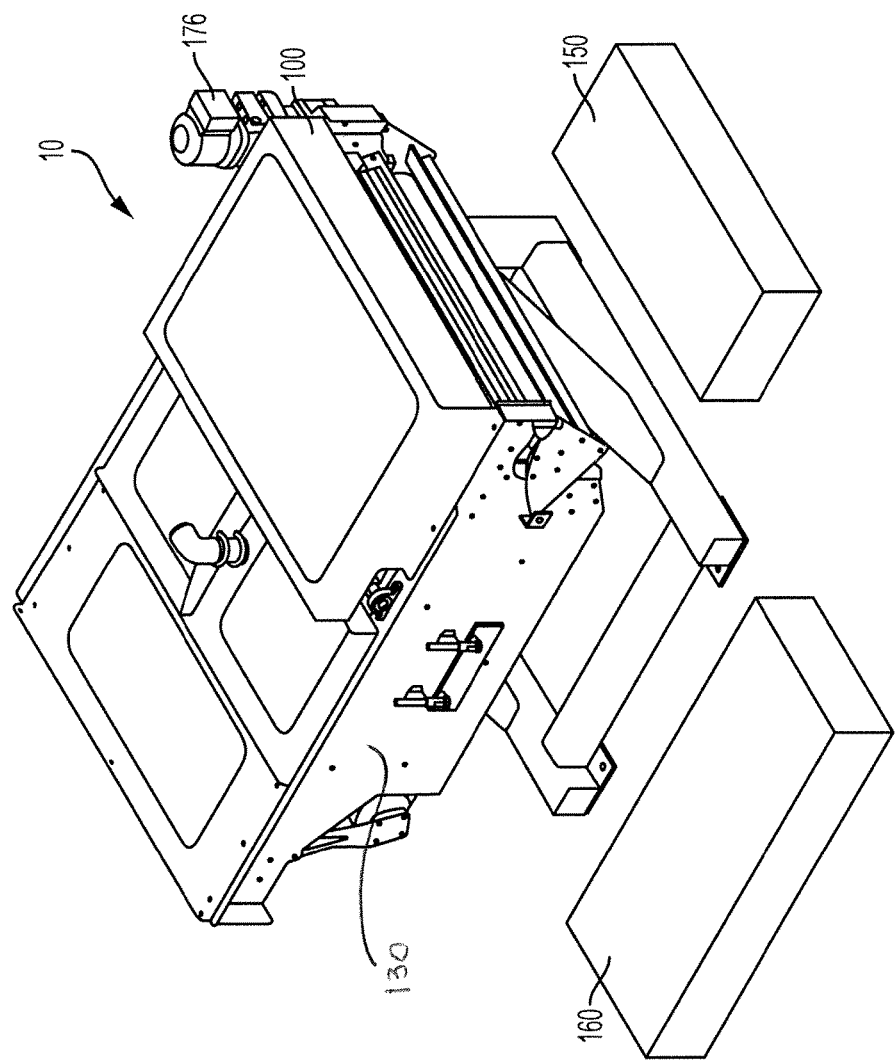
FIG. 3 is a perspective view of the exterior of an embodiment of the separator of the present technology.
Figure 4:
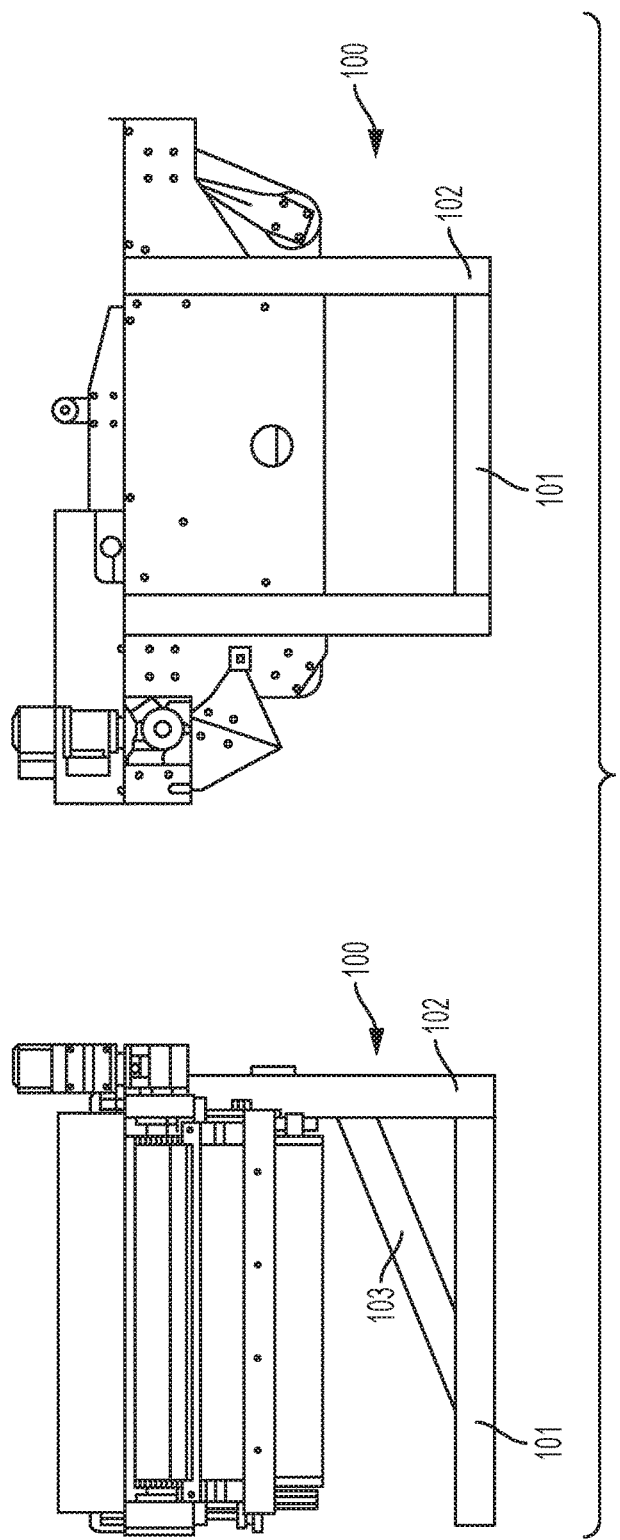
FIG. 4 is an end view and a side view, respectively, of an embodiment of the separator of the present technology.

As shown in FIG. 3, the frame 100 supports the filter vessel 130 above inlets of each of the residue cake bin 150 and the clean water holding tank 160. The frame may be made from steel, aluminum, or any other material of sufficient strength to support the separator components, as well as the slurry filtered by the separator. Referring to FIG. 4, in some embodiments the frame has a rectangular base 101, a plurality of legs 102, and one or more diagonal struts 103 at each end of the frame, providing additional support between the base and a leg of the frame.

Figure 2:
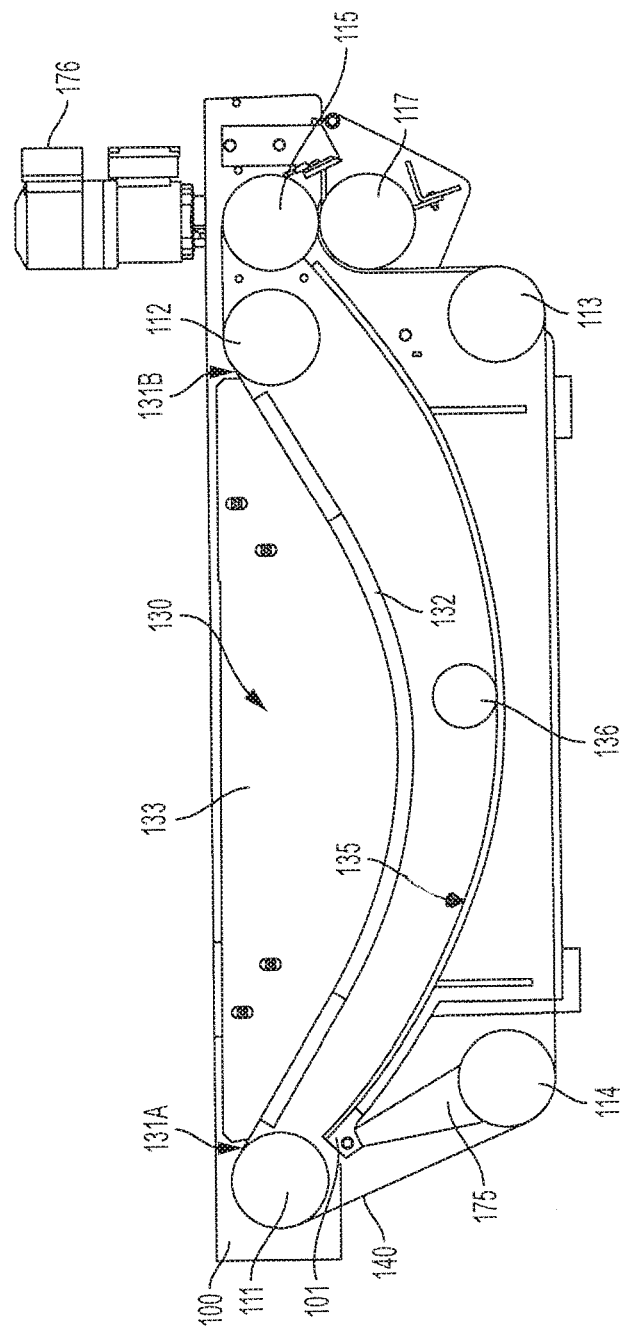
FIG. 2 is a side view of a portion of the embodiment of the separator shown in FIG. 1.
Figure 5:
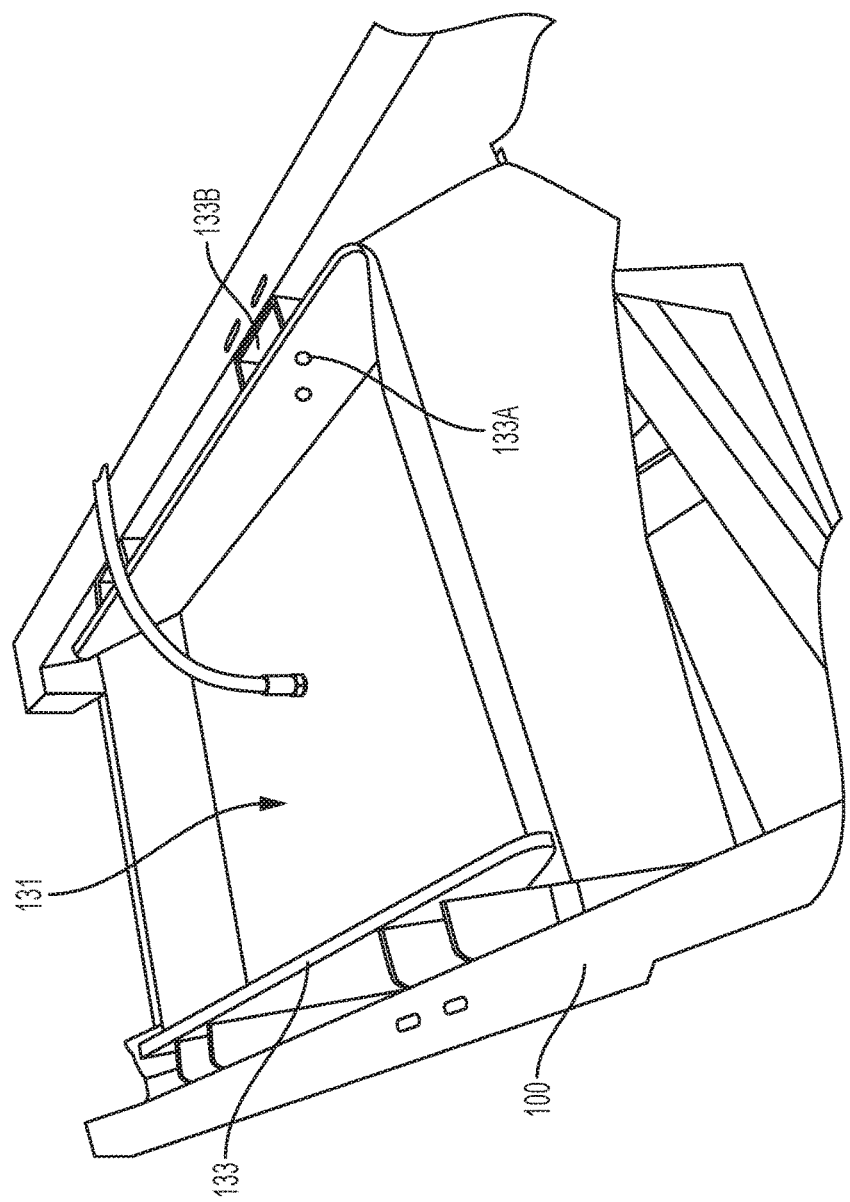
FIG. 5 is a perspective view of the top portion of an embodiment of the separator of the disclosed technology, with components removed to view components of the filter vessel, as hereinafter described.

The filter vessel has a slurry receiving area defined by a leading edge 131A and a trailing edge 131B, having a perforated panel 132 at its base, for receiving, pre-filtering and moving the slurry through the system of the disclosed technology, as shown in FIG. 1. The filter vessel further has a filter vessel collection tub 135 with an exit aperture 136 for collecting and delivering filtrate to the clean water holding tank 160. Referring to FIGS. 1, 2 and 5, to keep slurry and residue from entering into the filter vessel collection tub, the filter vessel receiving area has side sheets 133 installed parallel to each side of the filter vessel, about 2" from the sides of the filter vessel, running a portion of the length of the vessel, positioned above the edges of the filter media belt 140 as it traverses through the slurry receiving area of the filter vessel, and extending from and above the path of the filter media belt within the filter vessel. The side sheets may be secured to the frame by fasteners 133A, received by brackets 133B affixed to or extending through apertures on the frame 100. The side sheets may be ultra high molecular weight (UMHW) polyethylene sheets, having a thickness of about ¾", or other suitable, waterproof material having sufficient rigidity to maintain the slurry on the filter media belt.

The perforated panel 132 extends through the filter vessel, along the length of the slurry receiving area, to support the filter media belt 140 (see FIGS. 1 and 2). In the embodiment shown, the perforated panel has an arcuate profile, extending with smooth, symmetrical curvature from one end of the receiving area 131 to the other. The perforated panel may be made from stainless steel, and may have perforations to allow filtrate to pass into the filter vessel collection tub. The perforations may be circular, elliptical or another shape, wherein the openings may in the aggregate be 40-80% of the total surface area of the panel, as may be desirable based upon designed flow-rate, perforation shape, and media belt/ slurry support requirements of the separator system.

The filter vessel collection tub comprises a sealed, watertight structure made from plastic, metal or other suitable material. As shown in FIGS. 1 and 2, the bottom surface 137 of the filter vessel collection tub 135 may be contoured to match the profile of the perforated panel 132, with a centrally located exit aperture 136 or drain near or at the lowest point of the tub, designed and configured to deliver water from the filter vessel collection tub to the clean water holding tank 160. Further, the bottom surface of the filter vessel collection tub may be sloped toward the exit aperture to facilitate removal of clean water therefrom. The exit aperture 136 may be positioned on the side of the filter vessel collection tub, and may or may not have a mechanism (i.e., a spigot, door or valve) to open and close the aperture, thereby controlling the flow of water from the collection tub to the clean water holding tank.

Filter media belts 140 suitable for use in the disclosed technology include continuous loop belts. The media belt may be woven or non-woven, from engineering plastics, fabric, paper or metal mesh, tailored to the filtration design of the separator system and anticipated slurry characteristics (density, particulate size, temperature, pH, filtrate specifications, etc.). In some embodiments the filter media belt may be woven nylon, rubber or polyurethane, about 38" wide by 164" long; however, the width and length of the filter media belt may be adjusted based upon the size of the filter vessel and its roller configuration.

The rollers supporting the filter media belt in the separator of the present technology include four or more filter media idler rolls. As shown in FIGS. 1 and 2, a first or leading media idler roll 111 is affixed to the frame 100 to support the filter media belt tangent to the leading edge 131A of the slurry receiving area, conveying the filter media belt 140 to the perforated panel 132, and a second or trailing media idler roll 112 is affixed to the opposing side of the frame to support the filter media belt tangent to the trailing edge 131B of the filter vessel, conveying the filter media belt from the slurry receiving area. These idler rolls support the filter media belt in its pass through the slurry receiving area of the filter vessel. At least two return media idler rolls 113, 114 are affixed to the frame to set the return elevation of the filter media belt, below the filter vessel collection tub 135, and positioned to evenly support the load of the filter media belt and cause it to smoothly traverse the rollers.

As shown in FIGS. 1-3, one of the return media idler rolls 114 may be rotatably affixed to the frame 100 by means of a tension assembly 175, thereby providing tension to the filter media belt as it traverses about the rollers, and removing any slack from the belt. This tension assembly 175 may be positioned on the leading end of the filter vessel, below the leading media idler roll 111. The tension assembly may be a pair of elongated, stiff supports, rotatably coupled to the frame by means of a pin. In this configuration the pin traverses through protuberances on each side of the frame, and through an aperture of the support(s). As shown in FIG. 1-3, the supports may have a tapered length so that in operation it has mobility to rotate about the securing pin without the rotation being significantly inhibited by the frame structure 100. The tension assembly may include two stiff supports coupled with the frame and the return media idler in this manner, and rotatably supporting the roller 114 between the two supports by means of a roller pin, affixed to each stiff support and traversing through an aperture of the roller. By means of the tension assembly, the weight of the roller thereby adjusts the tension of the belt 140 about the rollers.

The plurality of rollers further comprises a drive roll 115, rotatably supported in some embodiments at the trailing edge of the filter vessel as shown in FIGS. 1-3 and 6. The rotation of the drive roll may be powered by a gear motor 176 also mounted on the frame, to cause the filter media belt 140 to traverse about the rollers of the present system. Small gear motors having an output speed of 8.5 RPM are suitable for use in the present technology, or similar gear motors having higher or lower RPMs, or variable RPMs, may be used in the disclosed technology. As shown in FIGS. 1-3 and 6, the drive roll may be fixed to the frame, parallel with and after the trailing media idler.

Figure 6:
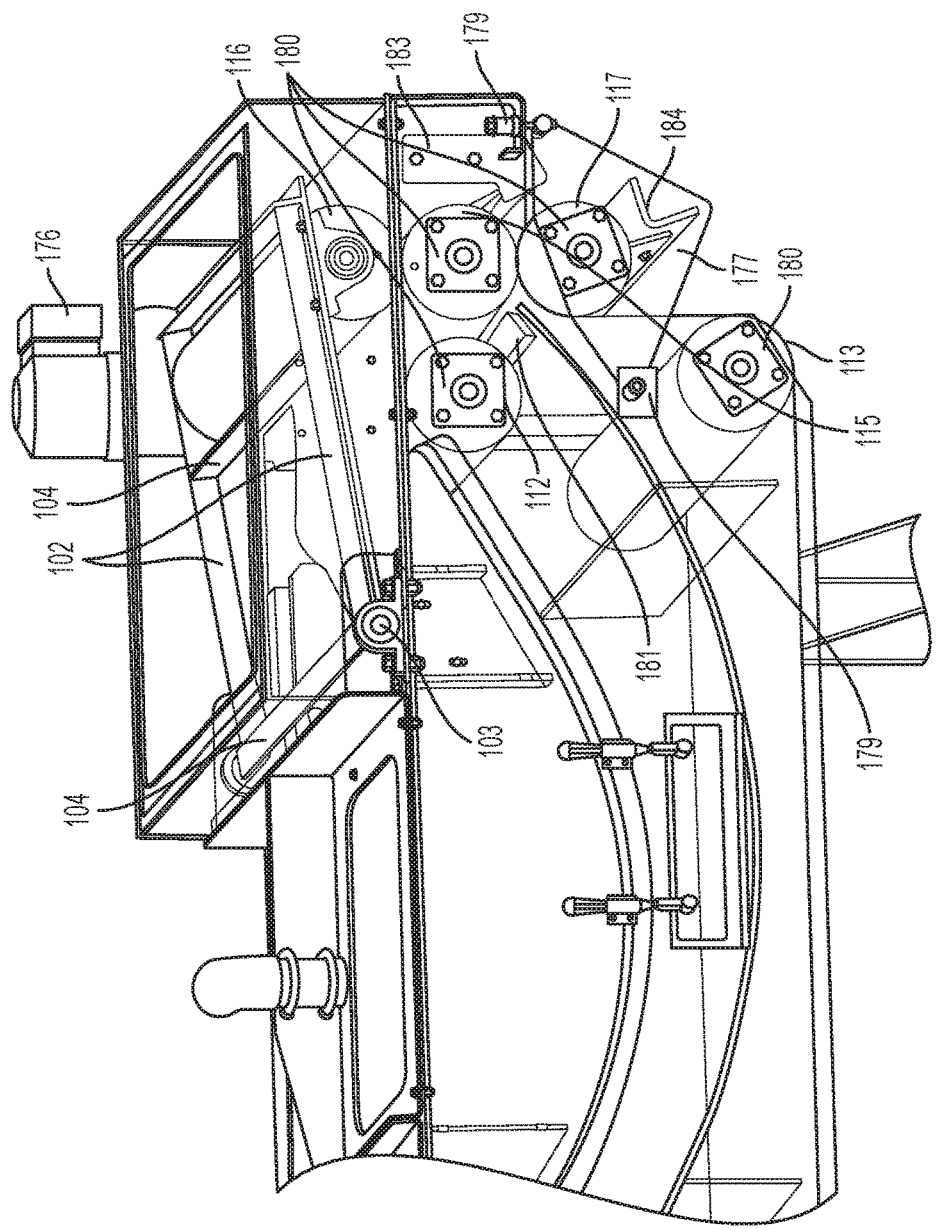
FIG. 6 is a side view of the trailing edge and rollers of a separator of the disclosed technology.

In addition, the plurality of rollers comprises a filtrate press roll assembly, affixed to the frame to position the press roller 116 of the assembly above, and in near vertical alignment with, the drive roller 115. As shown in FIGS. 1 and 6, the press roller rides on top of the drive roller, adjusting the distance between the rollers, to allow the slurry to pass through the press and drive rollers, and not get caught on the filter vessel side of the arrangement, while maintaining the rollers in close proximity to press and dewater the slurry as it passes there between, resulting in residual cake. In some embodiments the filtrate press roller 116 is positioned slightly behind the drive roller 115 in the direction of travel of the filter media belt 140, encouraging water removed from the press process to flow through the media belt into the filter vessel collection tub 135, while the dewatered residual cake continues to travel between the rollers. In some embodiments the filtrate press roll assembly is coupled with the top of the frame by means of a pair of rotatable arms 102, affixed to the frame at a fulcrum 103, with one or more crossbars supporting the rotatable arms, causing the filtrate press roller 116 to ride on top of the drive roller, adjusting its height as slurry volume on the filter media belt varies. The weight of the press roller (about 60 pounds in some embodiments) thereby provides pressure against the drive roller to dewater the slurry. This configuration has been found helpful in maintaining the belt on track as it traverses the rollers of the system of the present technology. In some embodiments the press roller is further coupled with the frame or the ends of the drive roller by pressure producing means such as springs, air cylinders, hydraulic cylinders, or other means to increase the downward press force of the press roller against the slurry on the media belt passing between the rollers.

The plurality of rollers further comprises a rubber coated NIP roller 117, affixed to the frame, positioned below and in near vertical alignment with the drive roller 115, as shown in FIGS. 1, 2 and 6. The variable distance between the NIP roller and the drive roller is sufficient to allow the filter media belt to pass between the NIP roller and the drive roller, and remove additional water held within the media belt 140; further, with the power drive roller, the pressure from the NIP roller against the drive roller provides sufficient grip to pull the filter media belt through the filter vessel. As shown in FIGS. 1, 2 and 6, in some embodiments the NIP roller 117 is rotatably affixed to the frame 100 by means of stiff plate supports 117, on each end of the NIP roller, affixed to the frame by securing pins 178 protruding through protrusions 179 on the frame, allowing the stiff plate supports (and the NIP roller) to rotate about the securing pins; the other end of the plate 177 may be affixed to the frame by means of a spring 179, as shown in FIG. 6. By this configuration the NIP roller position may be automatically adjusted and tensioned against the drive roller.

The rollers of the present technology have a length extending at least the width of the filter media belt. Suitable rollers include rubber coated rollers, steel rollers, and plastic rollers, having a 6" or other diameter, based upon the size of the filter vessel and the components of the slurry. In some embodiments the idler rollers are steel rollers, while the press and NIP rollers have ¼" thick rubber coating. The drive rollers may have grooves or protuberances to provide additional grip against the belt, with the pin thereof keyed on one end to interface with the motor. In some embodiments the rollers (other than the drive roller) are provided with pins extending through a central aperture of the roller, allowing the roller to rotate about the pin; in other embodiments the rollers are affixed to the pins, and the pins rotate within apertures of roller securing devices. Roller securing plates 180 provide means for securing the pins of the rollers to the frame (or protrusions thereof, as hereinabove described).

A plurality of blades or wipers remove residual cake and filtrate press water from the roller assembly, including a roll scraper blade 180 mounted to the filtrate press roll assembly to remove residual cake that may stick to the filtrate press roll, as shown in FIG. 6. In some embodiments this blade is fixedly positioned to the ends of the parallel rotatable arms 102 of the filtrate press roll assembly, on the outside of the filter vessel to encourage residual cake removed by the roll scraper blade 180 to fall directly into the residual cake bin 150. Likewise, as shown in FIGS. 1 and 6 a drive roll wiper assembly 181 mounted on the edge of the filter vessel collection tub 135 below the drive roll (and after the media belt passes between the drive and NIP rolls), directs filtrate press water into the filter vessel collection tub. Similarly, a residual remover 182 is mounted just below the drive roll, towards the outside of the filter vessel assembly, angled downward to direct residual cake into the residual cake bin. The residual remover may be removable from the frame by corresponding brackets 183 on each side of the remover, allowing for adjustment of the residual remover for various application specific configurations—i.e., varying angles, or changing the cleaner type (i.e., scraper blade, brush, powered scraper or other cleaner attachment). Finally, a roll scraper blade 184 is mounted to the support frame of the NIP roller to remove residual cake that may stick to the NIP roll; this roll scraper blade is positioned below the NIP roller, towards the outside of the filter vessel, nearly vertical, so that removed residual cake falls into cake bin 150. Each of the blades may be steel, plastic or rubber-coated reinforced blades, or other durable material sufficient to maintain rigidity against the respective roll and remove cake or from the surface thereof; the wipers may be made of rubber or other suitable material to remove water from the media belt.

Figure 7:
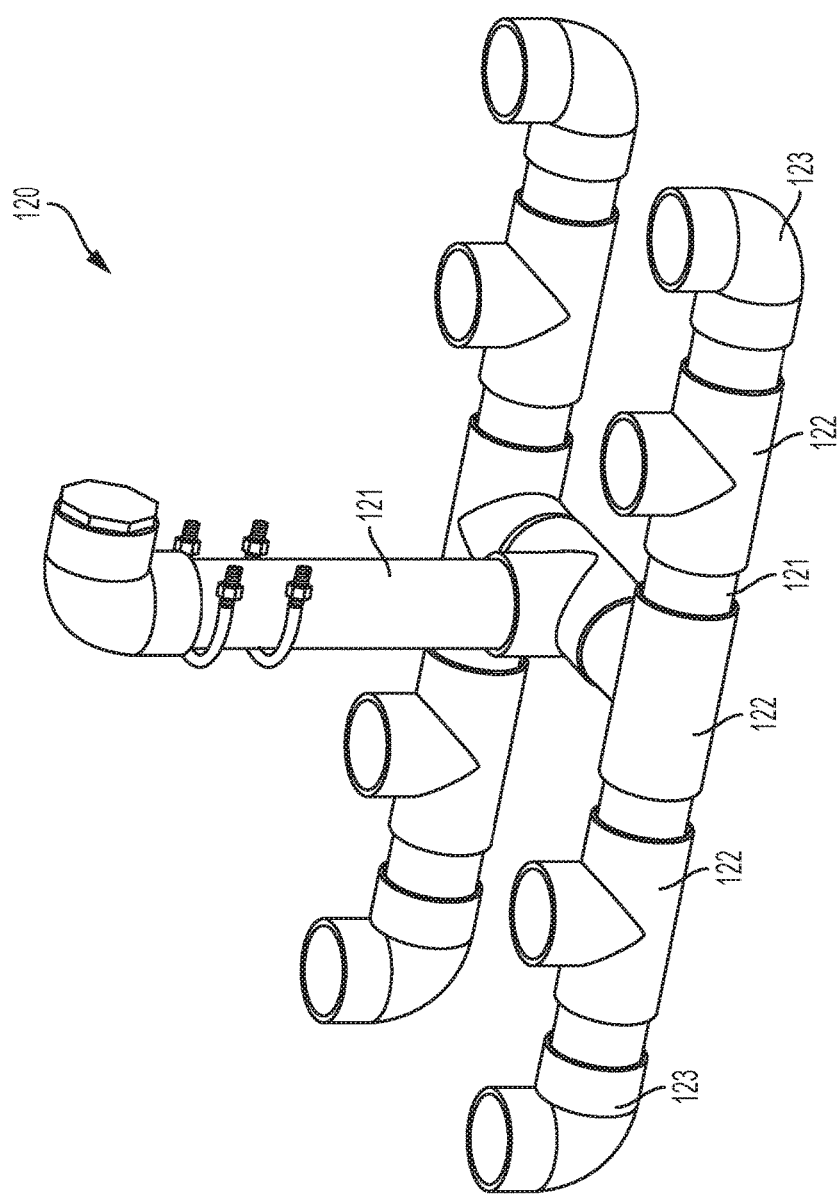
FIG. 7 is a perspective view of an embodiment of the inlet water manifold of the disclosed technology.

As shown in FIGS. 1 and 7, the disclosed technology further comprises an inlet water manifold 120 affixed to the frame, delivering slurry to the filter media belt for dewatering by means of the rollers as hereinabove described. The water manifold comprises a plurality of pipes 121 and pipe fittings 122 to distribute water uniformly on the filter media belt, allowing more slurry to be delivered to the media belt, with the outlets positioned above the media belt to distribute the slurry on the media belt and reduce outlet velocity. In the embodiment shown in FIG. 7, the inlet water manifold further has a plurality of elbow pipes 123 extending from the pipes and pipefittings, in an inverted position to provide a greater area of injection of slurry into the filter vessel. Other configurations may also be suitable.

The present invention further regards a method for separating filtrate water and cake residue from slurry, using a water/solids separator hereinabove described. This method includes continuously providing slurry through the inlet water manifold, while powering the gear motor to cause rotation of the drive roll, resulting in rotation of the filter media through the plurality of rollers. By this method and the disclosed technology, a portion of the water from the slurry is removed, through the filter media belt and the perforated panel. The slurry is then pressed or dewatered between the drive roll and the press roll to dewater the slurry, and water from the press is directed back into the filter vessel collection tub, while residue cake from the press is directed into the residue cake bin. The rolls are scraped or wiped throughout the process to remove any excess water in the media, or cake residue remaining on the rolls, with the excess being directed to the filter vessel collection tub or residue cake bin, respectively.

In the configuration herein described, the slurry is effectively dewatered as it passes through the press and drive rolls, wherein the press roll provides by at least its weight sufficient pressure against the slurry to dewater the slurry, the press roll adjusting its height relative to the drive roll by its coupling with the frame, as hereinabove described. Further, tension is provided to the media belt by the rotatable coupling of at least one of the media belt idlers, ensuring sufficient tension to allow the system of the disclosed technology to operate at a relatively high speed, without the belt tracking off of the rollers.

While the form of apparatus herein described constitutes preferred embodiments of the present technology, it is to be understood that the invention is not limited to this precise form of apparatus, and that changes may be made therein without departing from the scope of the invention that is defined in the appended claims.

The invention claimed is:

1. A water/solids separator for filtering slurry into residue cakes and filtrate water, the separator comprising
   a. a frame supporting a plurality of rollers, the plurality of rollers comprising:
      i. four or more filter media idler rolls to support a filter media belt,
      ii. a drive roll, wherein the rotation of the drive roll is powered by a gear motor,
      iii. a filtrate press roll positioned above, and in near vertical alignment with, the drive roll, and
      iv. a NIP roll positioned below and in near vertical alignment with the drive roll, and b. an inlet water manifold comprising a plurality of pipes and pipe fittings to distribute slurry water uniformly on the filter media belt,
c. a filter vessel having a slurry receiving area defined by a leading edge and a trailing edge, with a perforated panel at its base, for receiving and pre-filtering the slurry water to produce filtrate, and further having a filter collection tub with an exit aperture for collecting and delivering filtrate to a clean water holding tank,
d. the filter media belt traversing the plurality of rollers, and supported along a portion of its path by the perforated panel,
e. a residue cake bin, wherein the frame supports the filter vessel above the residue cake bin, and
f. a plurality of blades and wipers for removing filtrate water and dewatered residue from the filter media belt and the rollers, the plurality of blades and wipers comprising a roll scraper blade coupled with the filtrate press roll.

2. The water/solids separator of claim 1, wherein the filter slurry receiving area further comprises side sheets installed parallel to each side of the filter vessel, positioned above edges of the filter media belt as it traverses through the slurry receiving area of the filter vessel.

3. The water/solids separator of claim 1, wherein the perforated panel has an arcuate profile, extending with smooth, symmetrical curvature from one end of the slurry receiving area of the filter vessel to the other.

4. The water/solids separator of claim 1, wherein perforations of the perforated panel in the aggregate comprise 40-80% of the total surface area of the panel.

5. The water/solids separator of claim 1, wherein the bottom surface of the filter collection tub is contoured to match the profile of the perforated panel.

6. The water/solids separator of claim 1, wherein the filter media belt comprises a continuous loop belt made from woven nylon, rubber or polyurethane.

7. The water/solids separator of claim 1, wherein the media idler rolls comprise a first media idler roll affixed to the frame to support the filter media belt tangent to the leading edge of the slurry receiving area, a second media idler roll affixed to the opposing side of the frame to support the filter media belt tangent to the trailing edge of the filter vessel, and at least two return media idler rolls affixed to the frame to set a return elevation of the filter media belt, below the filter collection tub, and positioned to evenly support the load of the filter media belt and cause it to smoothly traverse the rollers.

8. The water/solids separator of claim 7, wherein one of the return media idler rolls is rotatably affixed to the frame by means of a tension assembly providing tension to the filter media belt as it traverses about the rollers, and removing any slack from the belt, wherein the tension assembly is positioned on the leading end of the filter vessel, below the leading media idler roll, and comprises a pair of elongated, stiff supports having a tapered length, rotatably coupled to the frame by means of a pin.

9. The water/solids separator of claim 1, wherein the filtrate press roll is coupled with the top of the frame by means of a pair of rotatable arms, affixed to the frame at a fulcrum, with one or more crossbars supporting the rotatable arms, causing the filtrate press roll to ride on top of the drive roll, adjusting its height as slurry volume on the filter media belt varies, and wherein the roll scraper blade is fixedly mounted on the ends of the rotatable arms.

10. The water/solids separator of claim 9, wherein the filtrate press roll has a weight of between 40 and 80 lbs.

11. The water/solids separator of claim 10, wherein the filtrate press roll is further coupled with the frame or the ends of the drive roll to increase the downward press force of the press roll against slurry on the media belt passing between the filtrate press roll and the drive roll.

12. The water/solids separator of claim 1, wherein the NIP roll is rotatably affixed to the frame by means of stiff plate support, coupled with each end of the NIP roll and affixed to the frame by securing pins on one end, and a spring at another end, thereby providing consistent tension against the drive roll.

13. The water/solids separator of claim 1, wherein the drive roll comprises grooves on its surface to provide additional grip against the filter media belt.

14. The water/solids separator of claim 1, wherein the plurality of blades and wipers further comprises a drive roll wiper assembly and a residual remover each mounted below the drive roll, and a roll scraper blade coupled with the NIP roll.

15. The water/solids separator of claim 1, wherein the inlet water manifold further comprises a plurality of elbow pipes extending from the pipes and pipefittings, in an inverted position.

16. A method for separating filtrate water and cake residue from slurry, wherein the method comprises the steps of:
a. providing a water/solids separator for filtering slurry into residue cakes and filtrate water, the separator comprising
a frame supporting a plurality of rollers, the plurality of rollers comprising: four or more filter media idler rolls to support a filter media belt; a drive roll, wherein the rotation of the drive roll is powered by a gear motor; a filtrate press roll positioned above, and in near vertical alignment with, the drive roll, and; and a NIP roll positioned below and in near vertical alignment with the drive roll, and
an inlet water manifold comprising a plurality of pipes and pipe fittings,
a filter vessel having a slurry receiving area defined by a leading edge and a trailing edge, with a perforated panel at its base, and further having a filter collection tub with an exit aperture,
the filter media belt traversing the plurality of rollers, and supported along a portion of its path by the perforated panel,
a residue cake bin, wherein the frame supports the filter vessel above the residue cake bin, and
a plurality of blades and wipers, the plurality of blades and wipers comprising a roll scraper blade coupled with the filtrate press roll; and
b. continuously providing slurry through the inlet water manifold, the manifold being designed and configured to deliver the slurry uniformly above the filter media belt,
c. providing power to the gear motor, thereby rotating the drive roll and causing the filter media belt to traverse the plurality of rollers,
d. removing a portion of the water from the slurry, through the filter media belt and the perforated panel,
e. pressing the slurry between the drive roll and the press roll to dewater the slurry,
f. directing water from the pressing process into the filter collection tub, and directing slurry into the residue cake bin, and g. scraping the filtrate press roll to remove any remaining residue cake therefrom.

\* \* \* \* \*

UNITED STATES PATENT AND TRADEMARK OFFICE
CERTIFICATE OF CORRECTION

PATENT NO. : 9,675,915 B1
APPLICATION NO. : 15/095265
DATED : June 13, 2017
INVENTOR(S) : Timothy Wayne Warden et al.

It is certified that error appears in the above-identified patent and that said Letters Patent is hereby corrected as shown below:

On the Title Page

Item (73) Assignee: "Englo, Inc., Beckley, VA (US)"
Should read:
(73) Assignee: --Englo, Inc., Beckley, WV (US)--;

Item (75) Inventors: "Timothy Wayne Warden, Beckley, WV (US);
Sita Miller, Lexington Park, MD (US);
Rubin Shmulsky, Starkville, MS (US);
Joseph C Finn, Travelers Rest, SC (US);
Ronald C Lane, Pisgah Forest, NC (US)"
Should read:
(75) Inventors: --Timothy Wayne Warden, Beckley, WV (US);
Sita Millar, Lexington Park, MD (US);
Rubin Shmulsky, Starkville, MS (US);
Joseph C Finn, Travelers Rest, SC (US);
Ronald C Lane, Pisgah Forest, NC (US)--; and In the Claims Column 8, Claim 16, Lines 36-37:
"and in near vertical alignment with, the drive roll, and; and a NIP roll positioned below and in near"
Should read:
--and in near vertical alignment with, the drive roll; and a NIP roll positioned below and in near--.

Signed and Sealed this
Sixth Day of February, 2018

Joseph Matal
*Performing the Functions and Duties of the
Under Secretary of Commerce for Intellectual Property and
Director of the United States Patent and Trademark Office*